Feb. 5, 1924.
M. P. LAUGHLIN
1,482,754
LIQUID FEED REGULATOR
Filed Aug. 7, 1920
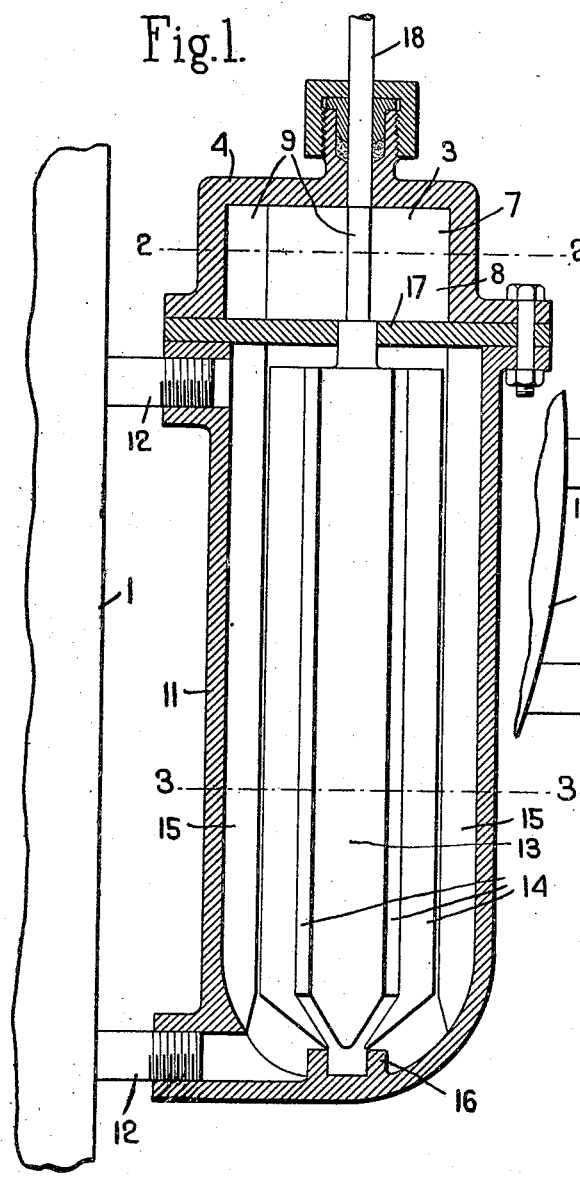
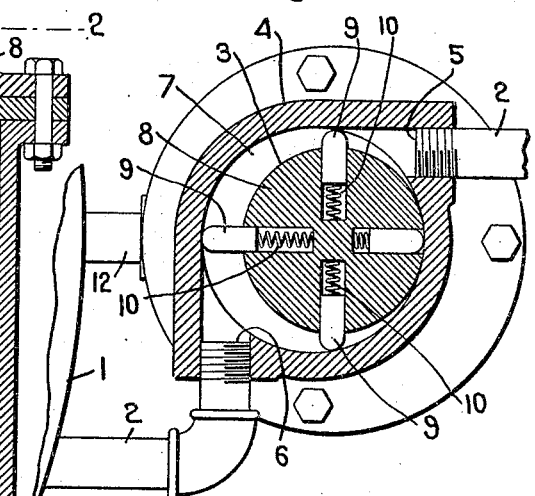
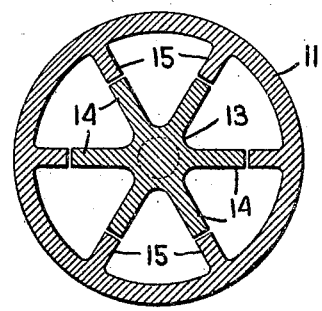
Inventor.
Myron P. Laughlin
by Heard Smith & Tennant.
Attys.

Patented Feb. 5, 1924.

1,482,754

UNITED STATES PATENT OFFICE.

MYRON PENN LAUGHLIN, OF LOWELL, MASSACHUSETTS.

LIQUID-FEED REGULATOR.

Application filed August 7, 1920. Serial No. 402,012.

*To all whom it may concern:*

Be it known that I, MYRON P. LAUGHLIN, a citizen of the United States, and resident of Lowell, county of Middlesex, State of Massachusetts, have invented an Improvement in Liquid-Feed Regulators, of which the following description, in connection with the accompanying drawing, is a specification, like characters on the drawing representing like parts.

This invention relates to a liquid level controller by which the level of liquid in a boiler, tank, or other container may be automatically controlled. One of the objects of the invention is to provide a novel liquid level controller, which is so constructed that it will vary the rate of liquid flow into the container as the liquid level in the container rises and falls. In other words, the lower the liquid level in the container falls, the more rapid will be the rate of flow into the container, and the higher said liquid level rises, the slower will be the rate of flow into the container. With my invention the liquid will flow into the container at a varying rate of flow, dependent on the liquid level in the container.

My invention is useful in connection with a great variety of containers to which liquid is delivered, and from which liquid is withdrawn, and wherever it is desired to maintain the liquid level in the container at approximately a fixed point. The device is especially advantageous in connection with steam boilers, because with the invention the feed water will be flowing to the boiler constantly so long as steam is being used, and at a rate of flow which varies, depending upon the amount of steam used.

In order to give an understanding of my invention, I have illustrated in the drawings a selected embodiment thereof, which will now be described, after which the novel features will be pointed out in the appended claims.

In the drawings, Fig. 1 is a vertical, sectional view through a device embodying my invention.

Fig. 2 is a section on the line 2—2, Fig. 1.

Fig. 3 is a section on the line 3—3, Fig. 1.

In the drawings, 1 indicates a portion of a container which is supplied with liquid through a conduit 2. This container may be a boiler, a tank, or any other type of container, and the liquid may be supplied through the conduit either by gravity or under pressure, as desired or as required by the manner in which the container is used.

I have provided means which controls the rate at which liquid can flow through the conduit 2, which means in turn is controlled by the liquid level in the container, the construction being such that when the liquid level falls, said means permits the liquid to flow more rapidly through the conduit 2, and when the liquid level rises, the rate of flow through the conduit is cut down or decreased.

Various devices for thus regulating the rate of flow through the conduit may be employed without departing from my invention. In the construction shown, I have illustrated a device in the form of a motor, which is actuated by the liquid flowing through the conduit, and the speed of operation of which controls the amount of liquid which thus flows. This motor device is indicated generally at 3, and it comprises a casing 4 having an inlet 5 and a discharge 6, said inlet and discharge being connected into the conduit 2 so that the water flowing through the conduit will flow through the casing. The casing is provided with a cylindrical chamber 7 in which is a rotor 8 situated eccentrically. This rotor is provided with spring-pressed radially movable blades 9, which are maintained in contact with the wall of the chamber 7 by the action of springs 10. This is one familiar type of rotary motor, and the construction is such that the liquid flowing through the casing will cause the rotor to rotate and the speed of rotation of the rotor is determined by the rate at which the liquid flows through the casing.

My invention also comprises a brake element or retarding device which is associated with the motor device, and which is constructed to apply a greater or less braking or retarding action thereon, depending on the level of the liquid in the container 1, so that when the liquid level in the container is high, and increased braking or retarding action will be applied to the rotor, while when the liquid level falls, a decreased retarding action will be applied.

The retarding element may be constructed in various ways without departing from my invention. One simple, retarding element is herein shown, and it comprises a chamber 11 which is connected at its top and bottom to the container 1 by pipe connections 12, so that the level in the chamber 11 will always coincide with that in the container 1. Situated within the chamber 11 is a liquid brake element 13 which is operatively connected to the rotor 8 so as to be rotated thereby. This brake element 13 is constructed so that it will have a greater or less braking or retarding action dependent on the level of the liquid in the chamber 11. The brake element herein shown is provided with a plurality of radial fins or blades 14, and the chamber 11 is provided with a plurality of fins 15 extending longitudinally thereof, and inwardly from the wall thereof, as shown best in Fig. 3. Since the braking element 13 is operatively connected to the rotor 8, it will be rotated by said rotor, but the rotary movement thereof will be retarded by the liquid in the chamber 11. The fins 15 serve to prevent the liquid in the chamber 11 from being rotated by the rotary movement of the brake element 13, and thereby this liquid will have a decided retarding action on the element 13. The amount of such retarding action will vary, of course, as the liquid level in the chamber 11 varies. Thus if the liquid level rises so that an increasing portion of the brake element 13 is submerged in the liquid, the retarding effect will be correspondingly increased, thus slowing down the rotor and decreasing the rate at which the liquid is delivered to the container. On the other hand, if the liquid level falls so that a decreasing portion of the brake element 13 is submerged in the liquid, then said brake element will have a correspondingly decreased braking or retarding effect, thus allowing an increased amount of liquid to flow to the container.

Any suitable connection may be employed between the brake element and the rotor. A simple construction is herein illustrated wherein the rotor chamber 7 is superposed on the chamber 11 and the brake element 13 and rotor 8 are mounted on the same shaft. The lower end of the shaft is shown as journaled in a suitable bearing 16 formed at the bottom of the chamber 11, and said shaft extends through the partition 17 which divides the chambers 11 and 7 from each other. If desired this shaft may be extended above chamber 7 as shown at 18 to provide for operating a revolution counter or other indicating device.

From the foregoing it will be apparent that with this invention any change in the rate of flow of the liquid through the conduit 2 will be a gradual one, and that as the liquid level falls in the container, the rate of flow will gradually increase to compensate for such fall, for while the liquid level rises the rate of flow will gradually decrease to compensate for such rise.

The motor 3 constitutes a means for measuring the liquid which flows through the pipe 2, because at each rotation of the rotor 8 a certain volume of liquid will pass through the casing. Hence by having an indicator or counter as above suggested, which is properly graduated, it will be possible to give an indication of the amount of liquid which is delivered in any given time.

The rate at which the rotor 8 rotates depends upon the liquid level in the chamber 11, and as a result the rate of flow is at all times proportionate to the liquid level. Thus the rate of rotation of the rotor or movable device 8 depends upon and is proportionate to the liquid level in the chamber 1 and by observing the rate of rotation of the rotor a knowledge may be had of the level of the liquid within the container. The rate of rotation of the rotor is controlled by the braking effect of the retarding element which is, therefore, a means connected to the movable device to indicate the level of the liquid within the container.

My invention, therefore, involves the use of means for measuring the quantity of liquid delivered to the container and for controlling the rate of flow proportionately to the liquid level.

While I have herein illustrated one embodiment of my invention, yet I wish it understood that the construction shown is for illustrative purposes only and not with the idea of limiting the invention, for it will be obvious that the character of the motor or measuring device and the character of the liquid brake may be varied in many ways without departing from the invention.

I claim:

1. In a liquid level controller, the combination with a container, of a conduit to supply liquid thereto, a movable device in the conduit which permits liquid to flow through the conduit when said device is moving, and means for varying the rate of movement of said device in accordance with variations in the liquid level in the container.

2. In a liquid level controller, the combination with a container, of a conduit to supply liquid thereto, a movable device in said conduit which permits the liquid to flow when said device is moving, and means for applying a varying retarding action to the movement of said device as the liquid level varies.

3. In a liquid level controller, the combination with a container, of a conduit to supply liquid thereto, means in said conduit actuated by the flow of liquid therethrough, and in turn controlling the rate of flow, and a retarding element connected to said means, and having a greater or less retarding action thereon depending on the liquid level in the container.

4. In a liquid level controller, the combination with a container, of a conduit for supplying liquid thereto, means in said conduit which is actuated by the liquid flowing therethrough, and which in turn determines the rate at which said liquid flows, a chamber connected to the container so that the liquid level therein will coincide with that of the container, and a retarding element in said chamber connected to said means.

5. In a liquid level controller, the combination with a conduit to supply liquid to a container, of a movable device in said conduit which permits flow of the liquid therethrough when said device is moving and which determines the rate of flow by its speed of movement, and means for varying said speed of movement in accordance with variations in the liquid level in the container.

6. In a liquid level controller, the combination with a conduit to supply liquid to a container, of a movable device in said conduit which permits flow of the liquid therethrough when said device is moving and which determines the rate of flow by its speed of movement, and means for applying a greater or less retarding action on said device depending on the liquid level in the container.

7. In a liquid level controller, the combination with a container, of a conduit to supply liquid thereto, a device for measuring the quantity of liquid flowing through said conduit and for controlling the flow therethrough, which device is in turn controlled by the liquid level in the container.

8. In a liquid level controller, the combination with a container, of a conduit to supply liquid thereto, a movable device in the conduit which permits liquid to flow through the conduit when said device is moved, and means connected to said movable device to indicate the level of the liquid within the container.

9. In a liquid level controller, the combination with a container, of a conduit to supply liquid thereto, a movable device in the conduit which permits liquid to flow through the conduit when said device is moved, and means connected to said movable device to retard the rate of movement of said movable device in proportion to the level of the liquid in the container whereby the rate of movement of said device indicates the level of the liquid.

In testimony whereof, I have signed my name to this specification.

MYRON PENN LAUGHLIN.